United States Patent [19]
Tadlock et al.

[11] Patent Number: 6,153,105
[45] Date of Patent: Nov. 28, 2000

[54] ICE-MAKER TREATMENT SYSTEM

[75] Inventors: John Tadlock, West Chicago; Dale Squier, Oswego, both of Ill.

[73] Assignee: United States Filter Corporation, Palm Desert, Calif.

[21] Appl. No.: 09/286,384

[22] Filed: Apr. 5, 1999

[51] Int. Cl.$^7$ ................................................. B01D 61/00
[52] U.S. Cl. .................. 210/650; 62/67; 62/348; 250/437; 422/24; 422/186; 210/167; 210/192; 210/748; 210/805
[58] Field of Search ............................ 210/97, 123, 167, 210/175, 192, 257.2, 258, 259, 321.6, 501.23, 503, 505, 508, 658, 739, 744, 748, 767, 805, 806, 257.1, 459; 62/66, 67, 73, 78, 135, 303, 340, 348, 76; 250/437; 422/186, 186.3, 24, 7; 222/146.1

[56] References Cited

U.S. PATENT DOCUMENTS

| 491,225 | 2/1893 | Pusey | 62/348 |
|---|---|---|---|
| 641,742 | 1/1900 | Wagner et al. | 62/67 |
| 1,437,518 | 12/1922 | Hemphill | 62/67 |
| 2,775,100 | 12/1956 | Howe | 62/107 |
| 3,144,755 | 8/1964 | Kattis . | |
| 3,233,417 | 2/1966 | Soderberg | 62/233 |
| 3,361,150 | 1/1968 | Horner | 137/93 |
| 3,484,805 | 12/1969 | Lorenz | 62/139 |
| 3,592,212 | 7/1971 | Schiemier et al. | 137/93 |
| 4,572,785 | 2/1986 | Braaten | 62/73 |
| 5,002,658 | 3/1991 | Isaacs | 210/85 |
| 5,005,364 | 4/1991 | Nelson | 62/76 |
| 5,112,477 | 5/1992 | Hamlin | 210/257.1 |
| 5,230,792 | 7/1993 | Sauska et al. | 250/437 |
| 5,239,836 | 8/1993 | Sakai | 62/233 |
| 5,289,691 | 3/1994 | Schlosser et al. | 62/78 |
| 5,374,380 | 12/1994 | James | 261/26 |
| 5,484,538 | 1/1996 | Woodward | 210/257.1 |
| 5,502,978 | 4/1996 | Field | 222/146.6 |
| 5,527,470 | 6/1996 | Suda | 210/739 |
| 5,900,143 | 5/1999 | Dalton et al. | 210/192 |
| 5,972,099 | 7/1999 | Bosko | 62/348 |

FOREIGN PATENT DOCUMENTS

| 4-222373 | 8/1992 | Japan | 62/67 |
|---|---|---|---|
| 4-222374 | 8/1992 | Japan | 62/67 |

*Primary Examiner*—Joseph W. Drodge
*Attorney, Agent, or Firm*—Greer, Burns & Crain, Ltd.

[57] ABSTRACT

A system for disinfecting water in an ice-making machine having a water inlet for receiving an incoming stream of water, a supply of recirculating water, a reservoir for containing the supply of recirculating water, a transport conduit for transporting water from the reservoir, and an evaporator plate which receives water from the transport conduit and over which at least one of the incoming stream and the recirculating supply can flow to form ice. The system comprises a device for treating at least one of the incoming stream and the recirculating supply in the transport conduit before the water from either flows over the evaporator plate.

29 Claims, 8 Drawing Sheets

ICE-MAKER TREATMENT SYSTEM

BACKGROUND OF THE INVENTION

The present invention relates to the treatment of drinking water designed for use in commercial ice-making machines, and more specifically to an apparatus, system, and method for ensuring that ice made in an ice-making machine is made with treated water.

Conventional commercial ice-making machines are susceptible to microorganism growth and contamination, and to scale build-up. For the sake of efficiency, in most such machines a volume of water is introduced into the machine and recirculated over a cold surface until a proper volume of ice has formed. As water begins to form ice, and the amount of water available for recirculation lessens, the amount of water being circulated through the machine can be replenished from an outside source. If there are microorganisms in the incoming water, in the recirculating water, in the air, or on surfaces inside the machine, the ice which is formed by the machine may become contaminated. In addition, dirt particles in the incoming water, in the recirculating water, in the air, or on surfaces inside the machine, can act as nuclei for scale build-up, which can cause clogging in the machine.

Conventional ice-making machines address the problems of microbial contamination and scale formation by treating the water before it enters the ice-making machine. Such treatment can involve disinfection and/or filtration techniques. Disinfection can reduce the microbial content of the incoming water, while filtration can remove certain microbes, as well as dirt particles, from the water.

Certainly, treatment of the incoming water in the above-described manner can reduce the number of microorganisms and/or dirt particles in the water entering the icemaking machine. However, any microorganisms that survive the initial disinfection of the water may still have the opportunity to flourish, as the water is repeatedly recirculated through the machine. In addition, any contaminants on interior surfaces of the machine, and any airborne contaminants within the machine, will have ample opportunity to contaminate the recirculating water prior to the water being transformed to ice, and to act as nuclei for scale build-up Thus, when equipped with treatment systems which treat only the incoming water, conventional ice-making machines fail to solve the problems of contaminated water being used to form ice, and of dirt particles acting as nuclei for scale build-up.

Accordingly, it is an object of the present invention to provide an improved system for treating the water used to make ice in an ice-making machine.

It is another object of the present invention to provide a retrofit unit for converting conventional ice-making machines to ice-making machines utilizing the present treatment system.

SUMMARY OF THE INVENTION

The above-listed objects are met or exceeded by the present system for treating water in an ice-making machine, wherein either or both the incoming flow of water and the flow of recirculating water is/are treated prior to flowing over the cooling surface of the ice-making machine.

More specifically, the present invention provides a system for treating water in an ice-making machine having a water inlet for receiving an incoming stream of water, a supply of recirculating water, a reservoir for containing the supply, a transport conduit for transporting water from the reservoir, and an evaporator plate, which receives water from the transport conduit and over which at least one of the incoming stream and the recirculating supply of water can flow to form ice. The ice-making machine includes a device for treating at least one of the incoming stream and the recirculating supply in the transport conduit before the water flows over the evaporator plate.

DESCRIPTION OF THE PREFERRED EMBODIMENT

Figure 1:
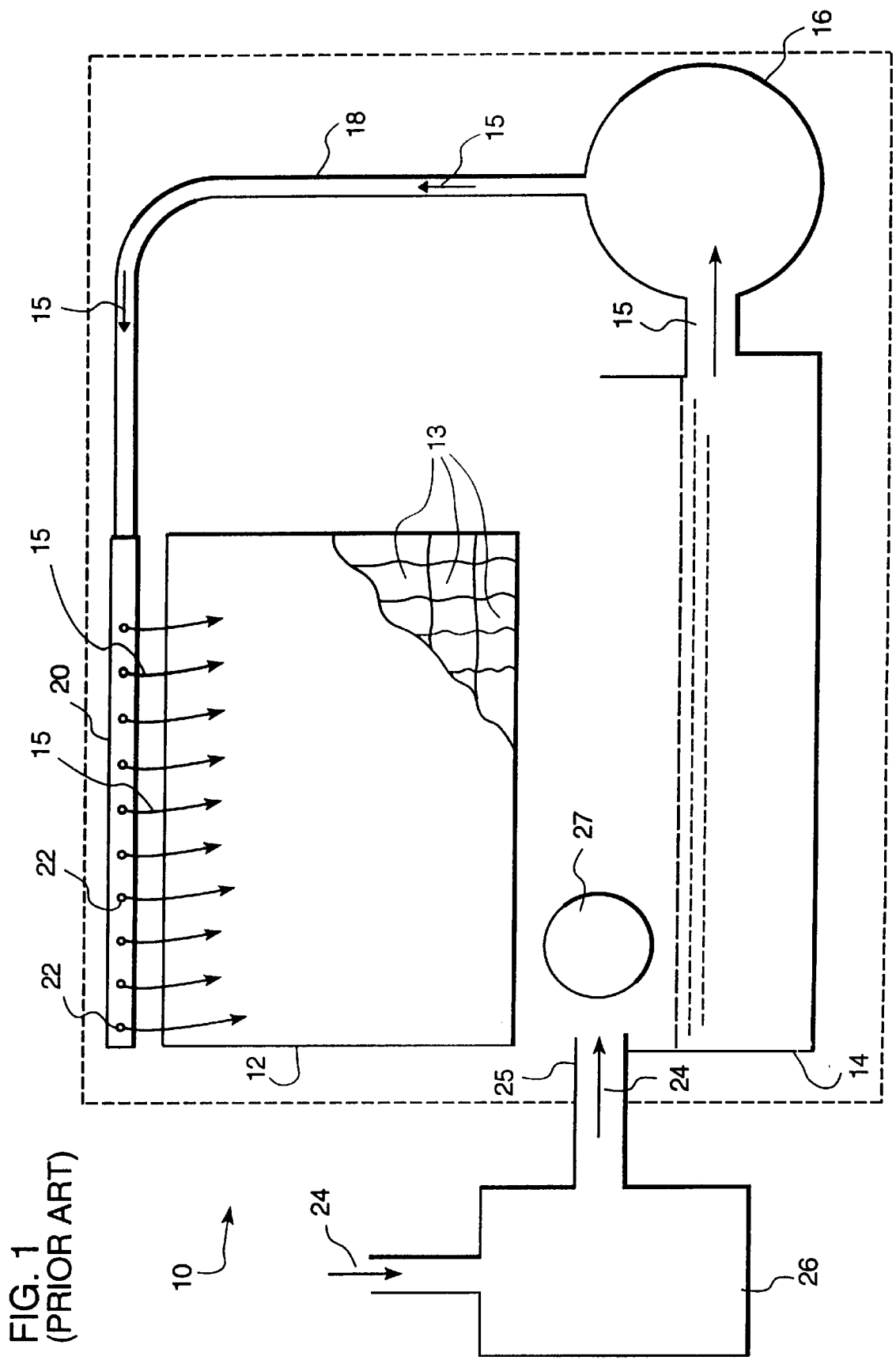
FIG. 1 is a schematic view of a conventional ice-making machine of the type well-known in the prior art.

Referring to FIG. 1, a conventional commercial ice-making machine is shown and generally designated 10. Such machines 10 are well known in the art, and are designed, constructed, and operate for the most part like the machine described in detail in U.S. Pat. No. 5,527,470 to Suda, which is hereby incorporated by reference.

Machines 10 of this type are often used in restaurants, hotels, fast food outlets, and similar establishments, and basically operate to turn water into ice cubes or crushed ice. The machine 10 includes an evaporator plate 12, a reservoir 14, a recirculating pump 16, a feed conduit 18, and a water distributor 20, all of which are in fluid communication with each other. The water distributor 20 has a plurality of openings 22 for distributing water in a cascading fashion down the face of the evaporator plate 12.

The evaporator plate 12 is covered with a number of preferably spheroidal or polygonal-shaped pockets 13 (only a few of which are shown), and is chilled by means well known in the art. As a result, a certain amount of the water passing over the evaporator plate 12 collects in the pockets 13 and freezes to the plate, thus forming ice. That water which does not freeze on the evaporator plate 12 returns to the reservoir 14, where it is pumped in a stream 15 back up the feed conduit 18 by the recirculating pump 16.

An incoming stream of water 24 to be used in ice-making is introduced to the machine 10 via a water inlet 25. The entry of the incoming water 24 is controlled by a water control valve 27, such as a float valve or a solenoid valve, in a manner well known in the art. The valve 27 keeps track of the level of water in the reservoir 14, and when the level of water gets too low, the valve opens to allow more water to enter the machine 10 through the water inlet 25.

Conventionally, the incoming water 24 is treated before it enters the machine 10, through exposure to a treatment device 26. The treatment device 26 operates by exposing the water 24 to any of a number of well-known treatment technologies, including disinfection and filtration technologies. Examples of such treatment technologies are described more fully below, and include exposure to ultraviolet light, micro-filtration, chemical or other known disinfection technologies, and mechanical filtration.

As pointed out previously, one of the major disadvantages of this conventional arrangement is that any microorganisms which survive the one-time disinfection, along with any airborne contaminants within the machine 10, and contaminants on the interior surfaces of the machine, will still have ample opportunity to flourish and/or act as nuclei for scale build-up in the water as it recirculates through the machine. Contaminated water may, of course, lead to contaminated ice, while scale build-up can interfere with the efficient operation of the machine. Reduction or elimination of these problems are objects of the present invention.

Figure 2:
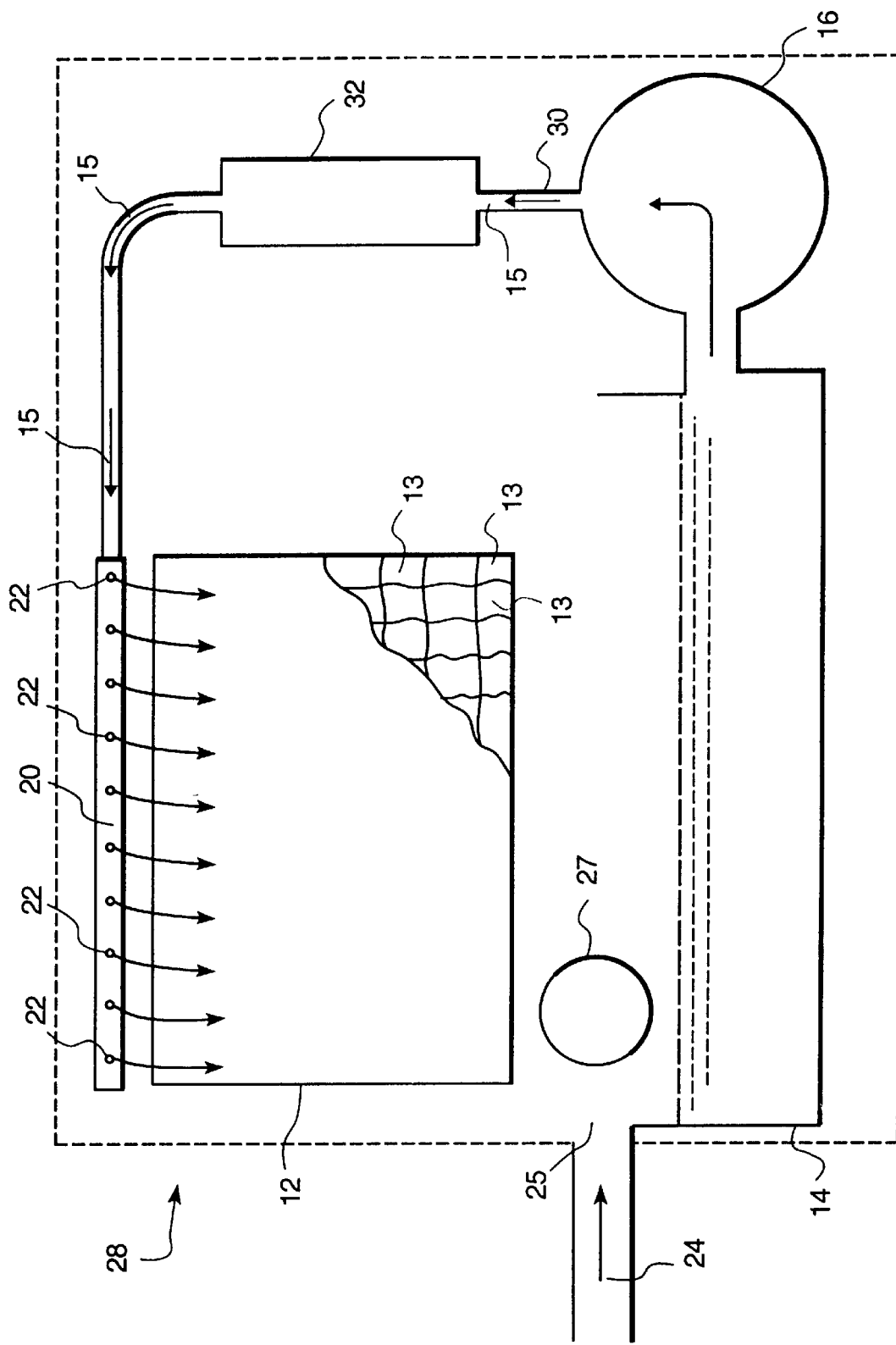
FIG. 2 is a schematic view of an ice-making machine equipped with the treatment device of the present invention.

Referring now to FIG. 2, an ice-making machine incorporating the treatment system of the present invention is shown and generally designated 28. Those features shared with the ice-making machine depicted in FIG. 1 are identically numbered and named. Depending upon the position of the valve 27, the incoming stream of water 24 periodically enters the ice-making machine 28 via the inlet 25. The incoming water 24 enters the reservoir 14 and mixes with any water already present in the reservoir. Next, the water in the reservoir 14 is pumped by the recirculation pump 16 up and through a transport conduit or tube 30 in the stream 15 toward the water distributor 20.

On its way to the water distributor 20, the transport conduit 30 operationally encounters a treatment device 32, which treats the stream 15 being carried in the transport conduit. The treated stream 15 then continues along the transport conduit 30 until it reaches the water distributor 20, at which point the stream flows through a plurality of holes 22 in the distributor and passes over the surface of the evaporator plate 12. As described previously, the evaporator plate 12 is cooled, and some of the water flowing over it will freeze to the pockets 13 in its surface, eventually forming ice cubes.

Placement of the treatment device 32 in this manner, so that all water in the stream 15 flowing through the transport conduit 30 toward the evaporator plate 12 must first be treated, is one of the major features of the present invention, in that it greatly reduces the chance of ice being made from contaminated water, and greatly reduces the opportunity for scale build-up. Where treatment of the water involves filtration, in addition to removal of certain microbes, removal of dirt capable of forming a nucleus for scale build-up is also achieved.

According to the preferred system of the present invention, all water in the stream 15 traveling through the transport conduit 30 toward the evaporator plate 12, whether fresh water from the inlet stream 24 or recirculated water from the recirculating supply which collects in the reservoir 14 after passing over the evaporator plate, must first encounter the treatment device 32. Thus, the stream 15 is treated just prior to passing over the evaporator plate 12, which reduces the possibility of the ice being formed from contaminated water.

It is contemplated that the treatment device 32 may incorporate a wide variety of treatment technologies. Examples are shown in FIGS. 3–7, and described below.

Figure 3:
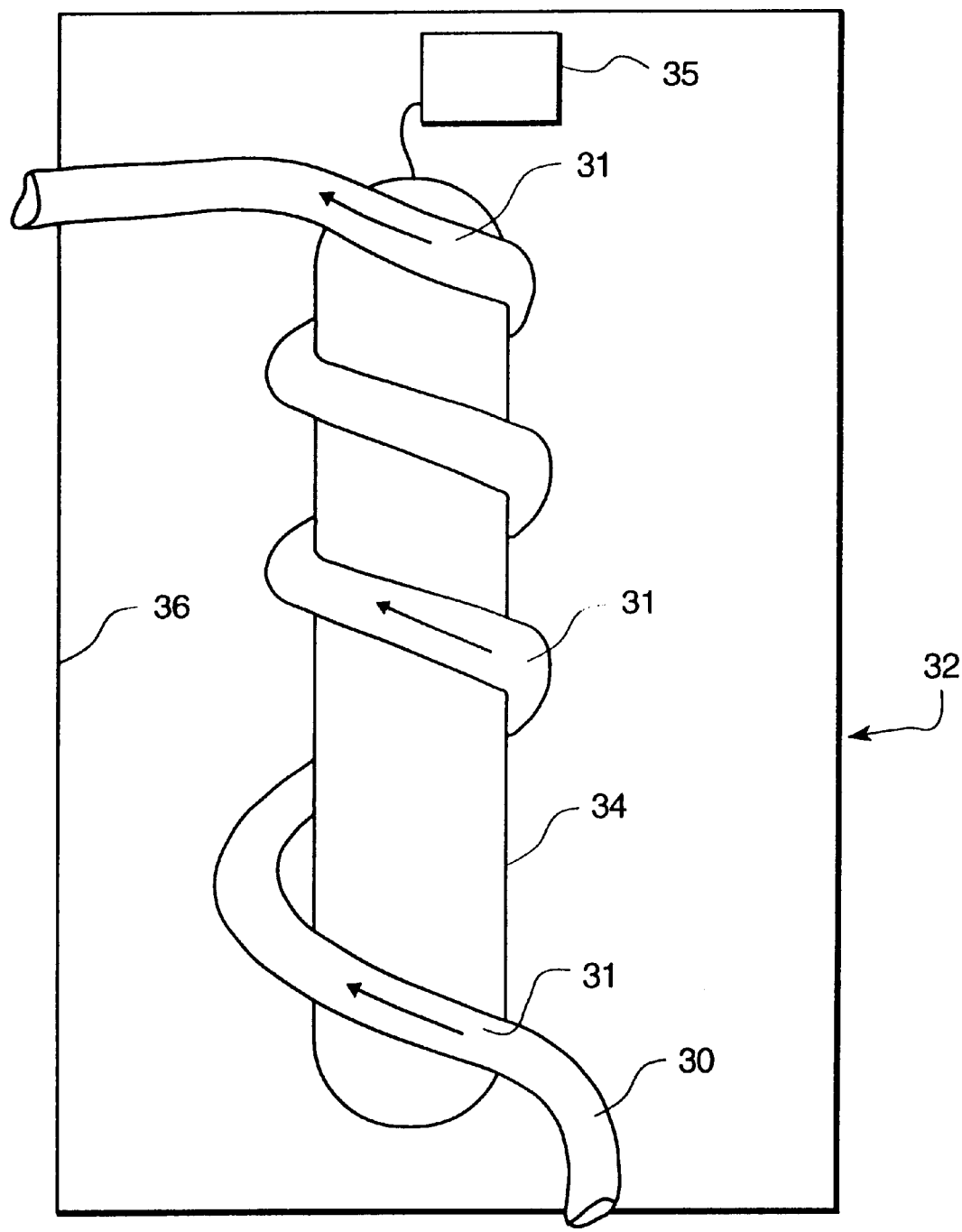
FIG. 3 is a schematic view of the preferred embodiment of the treatment system of the present invention.

Referring now to FIG. 3, the treatment device 32 is shown incorporating an ultraviolet lamp 34. The use of ultraviolet light in water disinfection is well known in the art. The lamp 34 should be of the mercury-vapor type, and should produce the majority of its energy at a wavelength around 254 nanometers, a wavelength known to be effective in killing microorganisms in water. An ultraviolet ballast 35 is preferably connected to the lamp 34 to stabilize the current flowing to the lamp.

When the treatment device 32 is an ultraviolet lamp 34, in the preferred embodiment the transport conduit 30 is a tube made of a material that is transparent to ultraviolet radiation, such as TEFLON® brand perfluoro(ethylene-propylene) copolymer ("FEP") or quartz. TEFLON® brand FEP tubes 30 provide a non-stick surface, which reduces the likelihood of contaminants in the stream 15 adhering to an inner surface of the tube and blocking the path of the ultraviolet light. In addition, a tube 30 made of TEFLON® brand FEP will not be brittle, and thus will be less susceptible to breakage than glass tubing would be. Furthermore, in the unlikely event that breakage occurs, by using TEFLON® brand FEP tubes 30 instead of glass, one avoids the possibility of pieces of broken glass becoming mixed with the ice being formed by the ice-making machine 28.

Still referring to FIG. 3, in the preferred embodiment the tube 30 is wound into an approximately helical or spiral shape, and is positioned so that the ultraviolet lamp 34 is located in the approximate center or axis of the spiral formed by the tube. Shaping the tube 30 and positioning the ultraviolet lamp 34 in this manner increases the likelihood, in at least two ways, that any contaminants in the stream 15 being transported through the tube will be exposed to ultraviolet radiation emitted from the lamp.

First, water turbulence is increased by forcing the stream 15 to negotiate bends in the tube 30. Greater turbulence in the stream 15 will shake up, dislodge and/or suspend contaminants in the water, increasing the chance that such contaminants will be exposed to, and destroyed by, the ultraviolet radiation being emitted from the lamp 34. Second, in line with the principle that the shortest distance between two points is a straight line, having the stream 15 flow through a spiral path means that the length of the journey of the stream past the ultraviolet lamp 34 is longer. This increases the amount of time that the stream 15, and any contaminants in that stream, will be exposed to the ultraviolet radiation emitted from the lamp 34. Also, to increase the total exposure of the stream 15 passing through the spiral wound tube 30, it is contemplated that the tube may be placed in a housing 36 made of polished aluminum or any other reflective material, which will act as a reflector for the ultraviolet radiation being emitted by the lamp 34.

Although a spiral or helical configuration of the tube 30 is preferred, with the ultraviolet lamp 34 positioned in the approximate center or axis of the spiral or helix, other shapes and configurations are contemplated, which operate to increase the exposure time of the stream 15 to the lamp.

Figure 4:
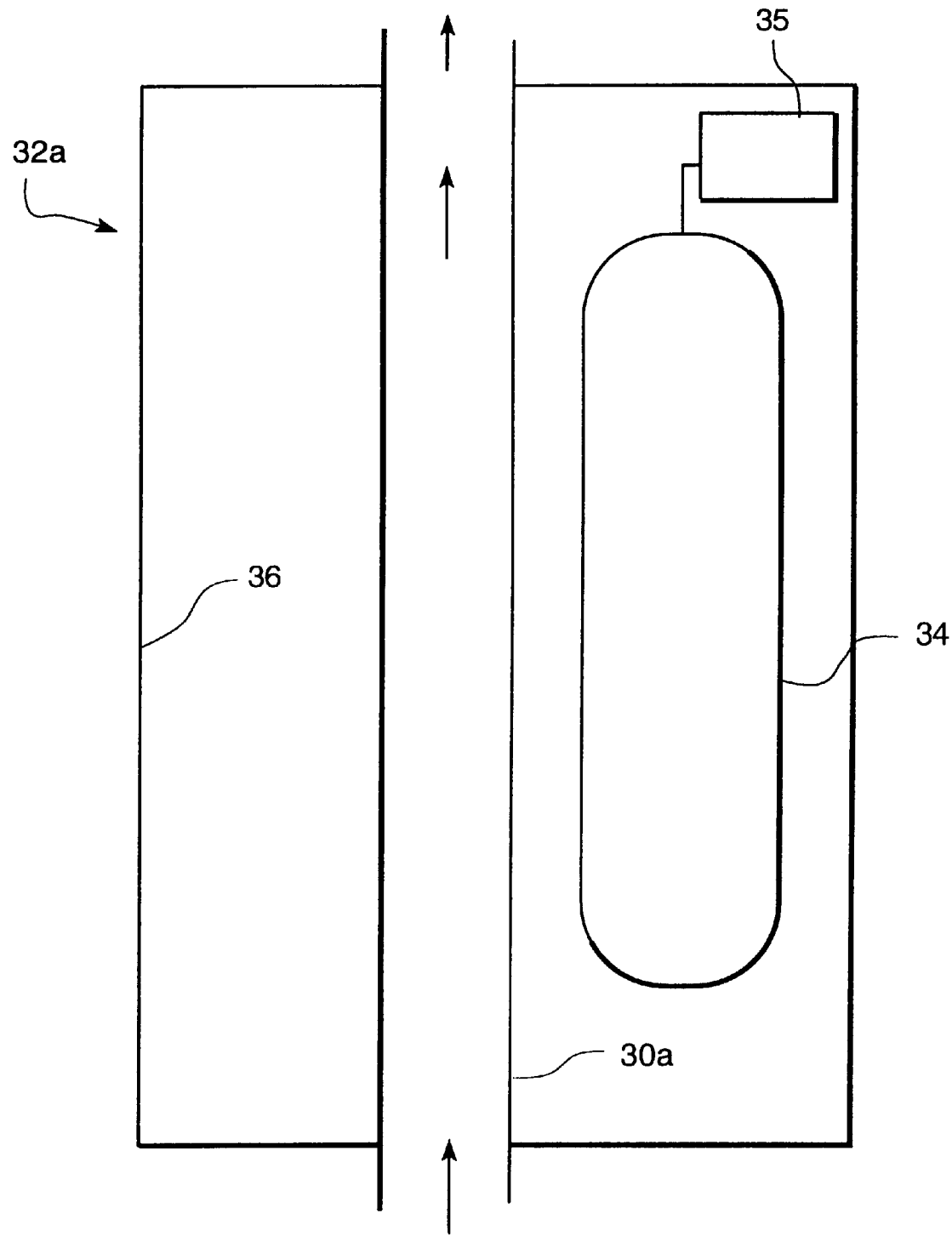
FIG. 4 is a schematic view of an alternate embodiment of the treatment device of the present invention.

Referring now to FIG. 4, an alternate embodiment of the treatment device of FIG. 3 is shown and generally designated 32a, in which the tube 30a simply passes alongside the ultraviolet lamp 34. It is also contemplated that the treatment device 32a may utilize a radiation source other than an ultraviolet lamp 34. It is further contemplated that the treatment device 32a and the transport tube 30 may be provided as a retrofit unit with necessary couplings and fittings (not shown) to permit adaptation of conventional ice machines 10 to utilize the system of the present invention.

Figure 5:
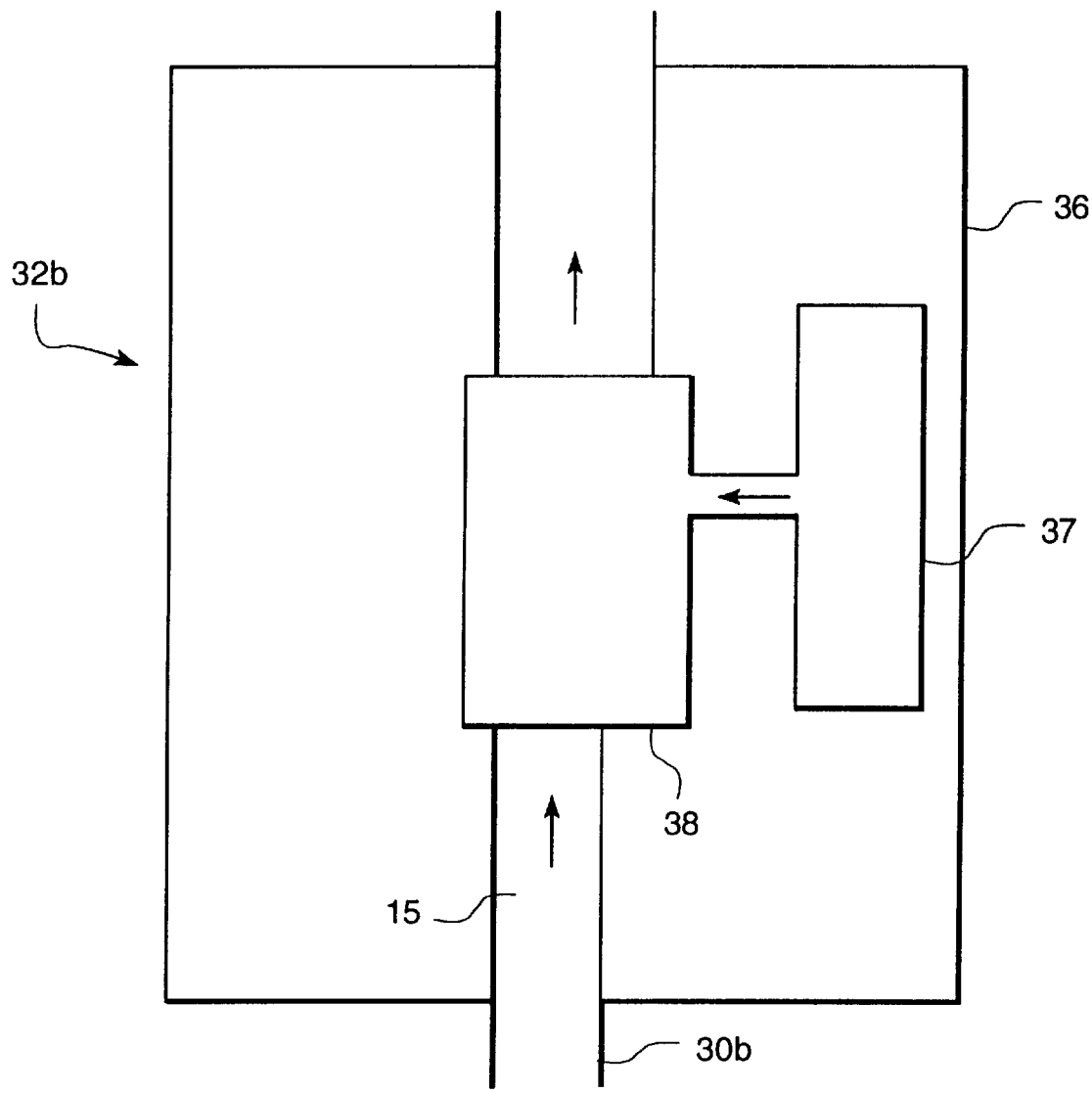
FIG. 5 is a schematic view of a second alternate embodiment of the treatment device of the present invention.

Referring now to FIG. 5, another embodiment of the present invention is depicted and generally designated 32b. In this embodiment, the treatment device comprises an ozone generator 37 in combination with a venturi eductor 38. Ozone is a very powerful water disinfectant, as is well known in the art. As the stream 15 of water flows through the transport conduit 30*b*, it encounters the venturi eductor 38 and a vacuum is created, sucking ozone out of the ozone generator 37 and into the water. Introducing ozone into the water disinfects the water It is also contemplated that a chlorine gas generator could be substituted for the ozone generator 37. Chlorine is another well known and effective water disinfectant.

Figure 6:
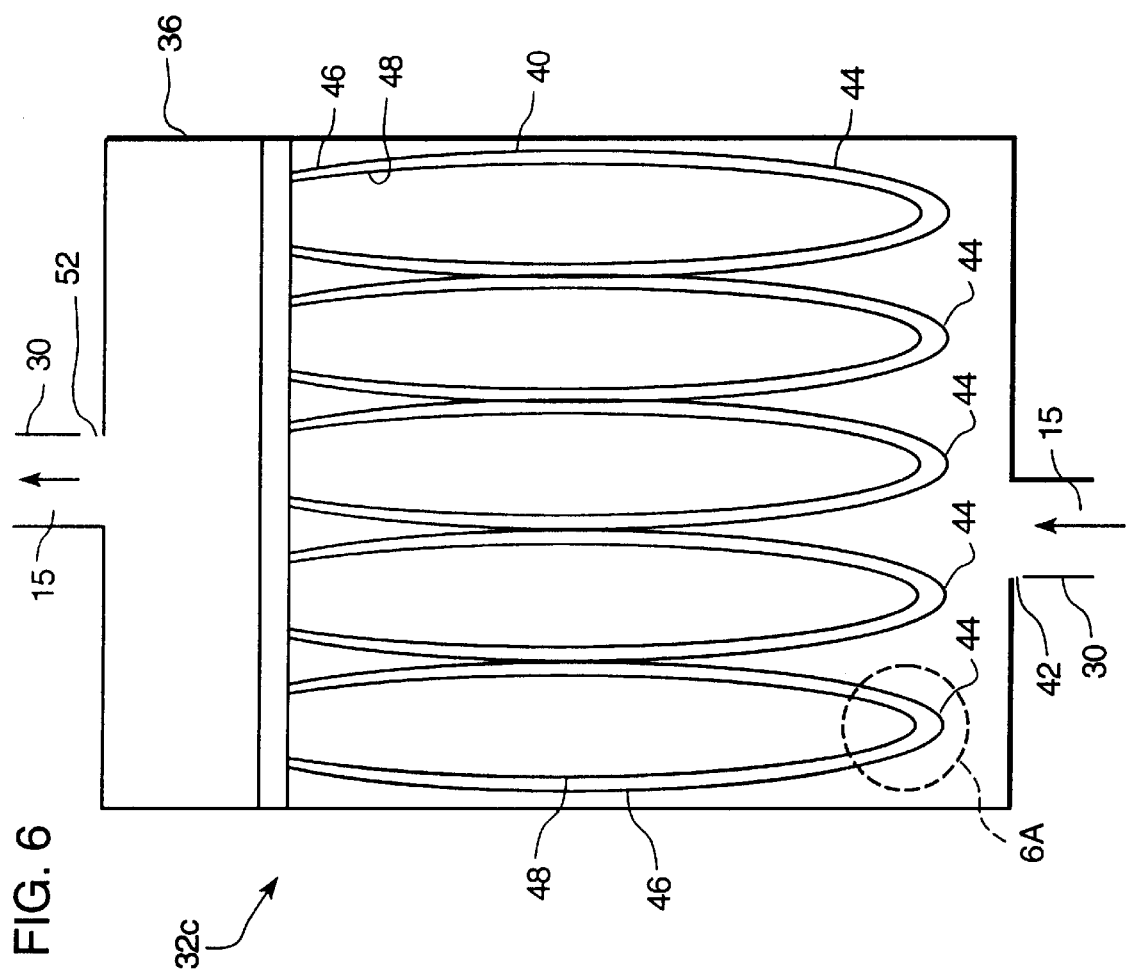
FIG. 6 is a schematic view of a third alternate embodiment of the treatment device of the present invention.
Figure 6A:
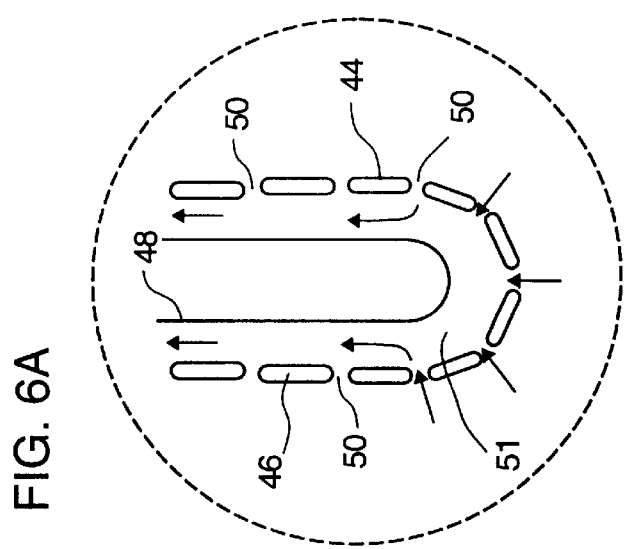
FIG. 6A is an enlarged fragmentary portion of FIG. 6.

Referring now to FIGS. 6 and 6A, another embodiment of the present invention is designated generally 32*c*, in which the treatment device 32*c* includes a hollow fiber filter 40. The stream of water 15 flows through the tube 30 and into the treatment device 32*c* through an inlet 42, where it encounters the hollow fiber filter 40. The hollow fiber filter 40 is made up of a large number of hollow fibers 44, each having an outer surface 46 and an inner surface 48. The outer surfaces 46 are provided with pores 50 (FIG. 6A). The incoming stream of water 15 is forced through the pores 50, into a hollow space 51 between the outer 46 and inner 48 surfaces of the fibers 44, and out through an outlet 52 of the treatment device 32*c*. Pores 50 having a diameter of approximately 0.02 microns are known to be small enough to filter out any bacteria in the stream of water 15 being forced through the filter 40. It is also contemplated that the hollow fibers 44 could be replaced by a membrane having similarly sized pores.

Figure 7:
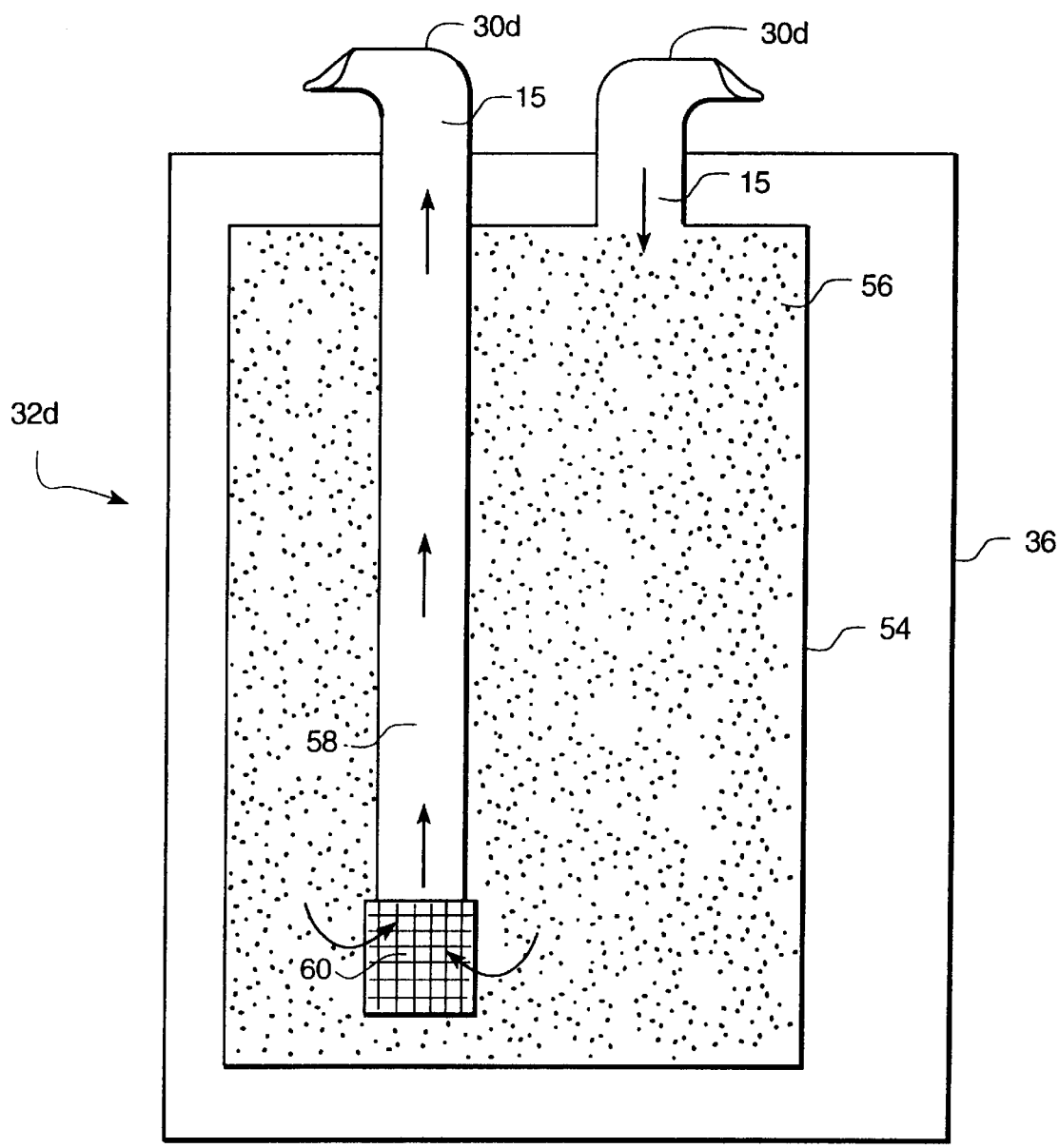
FIG. 7 is a schematic view of a fourth alternate embodiment of the treatment device of the present invention.

Referring now to FIG. 7, yet another embodiment of the present invention is generally designated 32*d*. Here, the treatment device 32*d* includes a filter 54 containing a resin 56 halogenated with bromine or iodine, which are known to be effective disinfectants. The incoming stream 15 enters the filter 54 through the tube 30*d* and passes through the halogenated resin 56, where it comes into contact with the bromine or iodine and is accordingly disinfected. In order to get to the outlet 58 the water must pass through a screen 60, where contaminants can be further removed. It is also contemplated that the filter 54 alternately contains a mechanical filter media and/or a filter media such as silver-carbon, copper or zinc, all of which are known anti-bacterial materials.

Referring again to FIG. 2, in the preferred embodiment of the present invention the incoming stream of water 24 enters the machine 28 through the inlet 25 and goes into the reservoir 14, where it mixes with any water already in the reservoir. Thus, the stream of water 15 carried by the transport conduit 30 toward and beyond the treatment device 32, 32*a–d* constitutes a mixture of water from the incoming stream 24 and recirculating water already present in the reservoir 14. In stark contrast to the conventional arrangement depicted in FIG. 1, both water from the incoming stream and recirculating water are treated before arriving at and flowing over the evaporator plate 12, which reduces the likelihood of ice being formed from contaminated water.

The present invention contemplates many ways of arranging the flow of water into and through the ice-making machine 28. In FIG. 2, for example, both fresh and recirculated water are mixed in the reservoir 14 prior to being pumped by the recirculating pump 16 in the stream 15 past the treatment device 32.

Figure 8:
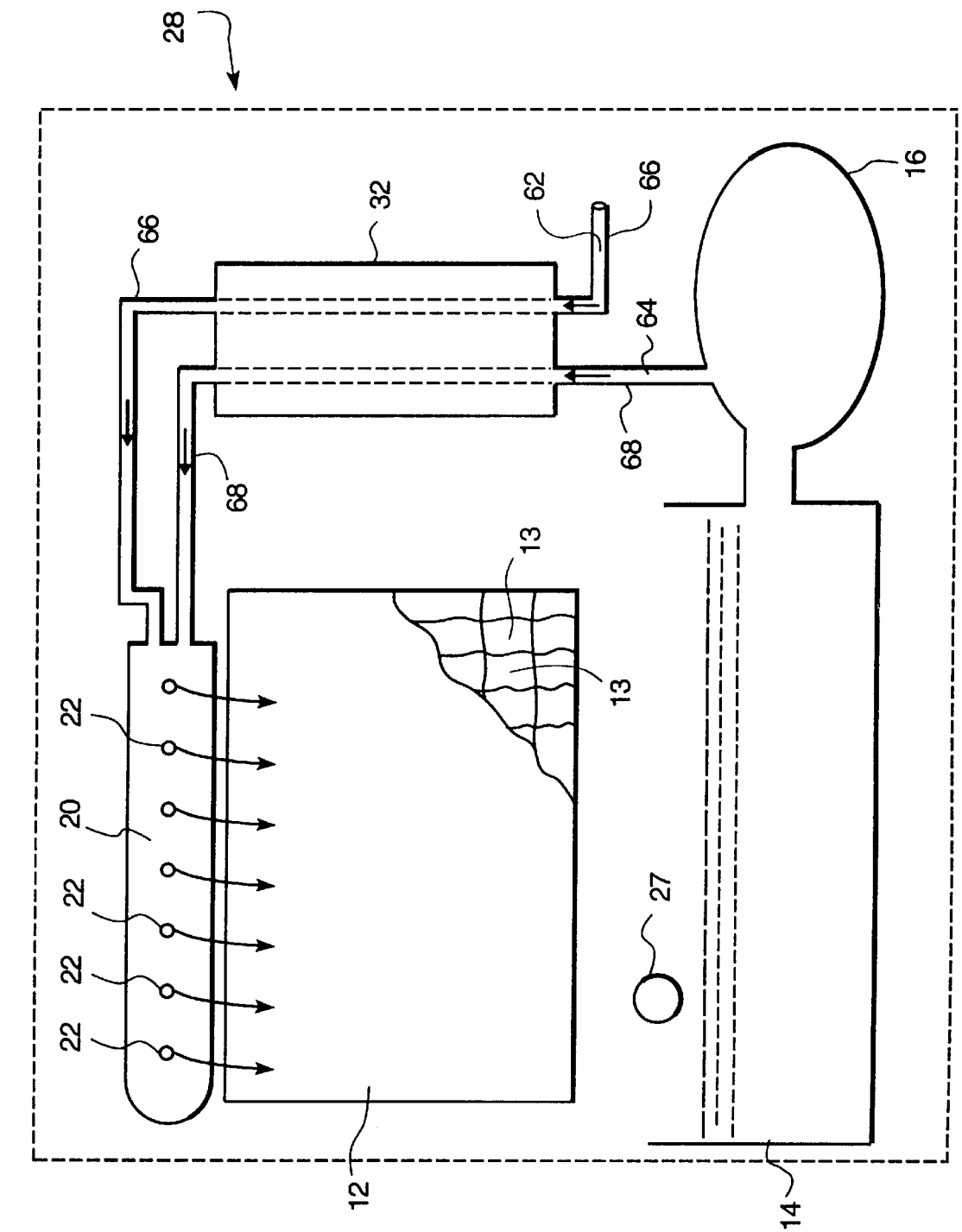
FIG. 8 is an alternate embodiment of the ice-making machine of the present invention.

Referring now to FIG. 8, an alternate embodiment is shown and generally designated 28*a*, in which an incoming stream of water 62 and a stream of water from the reservoir 64 are carried by or through the treatment device 32, 32*a–d* in separate transport conduits, 66 and 68 respectively. The separate streams of water 62, 64 become mixed only at the water distributor 20, before passing over the evaporator plate 12 and into the reservoir 14. Other water transport arrangements are contemplated, so long as all streams of water encounter the treatment device, and are treated, before flowing over the evaporator plate 12. This ensures that all ice is made from treated water.

Thus, the present system for treating water in ice-making machines can greatly reduce the chance of contaminated ice, and can greatly reduce the amount of scale build-up in the machine, by removing dirt from the water. Similarly, ice made according to a method comprising the present invention, and any ice-making machine which incorporates the present system, is a significant improvement over prior art methods and machines, in terms of water treatment and contaminant-free ice.

While particular embodiments of the present invention's disinfection system for ice-making machines has been shown and described, it will be appreciated by those skilled in the art that changes and modifications may be made thereto without departing from the invention in its broader aspects and as set forth in the following claims.

What is claimed is:

1. A system for treating water in an ice-making machine having a water inlet for receiving an incoming stream of water, a supply of recirculating water, a reservoir for containing said supply, a pump for pumping water from the reservoir, a transport conduit in communication with the pump for transporting pumped water from the reservoir to an evaporator plate, and the evaporator plate receives water from the transport conduit and over which at least one of the incoming stream and the recirculating supply of water can flow to form ice, water flowing from the evaporator plate is received in the reservoir for recirculation, said system comprising:

means for treating at least one of the incoming stream and the recirculating supply in the transport conduit, said means for treating being disposed in operational relationship to the transport conduit between the pump and the evaporator plate so that all water passing through the conduit is treated just prior to at least one of the stream and the supply flowing over said evaporator plate.

2. The system of claim 1 wherein said treatment means comprises at least one disinfection device including an ozone generator disposed for introducing ozone into the water for ozone treatment of the water.

3. The system of claim 1 wherein said treatment means comprises at least one filtration device.

4. The system of claim 3 wherein said at least one filtration device includes a filter media incorporating anti-bacterial materials selected from the group consisting of hollow fibers, a membrane, halogenated resin, silver-carbon, mechanical filters, copper and zinc.

5. The system of claim 1 wherein said treatment means comprises at least one ultraviolet disinfection device.

6. The system of claim 5 wherein said disinfection device comprises:

at least one ultraviolet lamp; and transport means for transporting at least one of said incoming stream of water and said recirculating water past said ultraviolet lamp and exposing said water to said lamp.

7. The system of claim 6 wherein said transport means comprises at least one tube.

8. The system of claim 7 wherein said at least one tube includes a first tube which carries a first stream of water, and a second tube which carries a second stream of water, past said at least one ultraviolet lamp.

9. The system of claim 7 wherein said at least one tube is comprised of material that is transparent to ultraviolet radiation.

10. The system of claim 9 wherein said at least one tube is wound into an approximately spiral shape.

11. The system of claim 10 wherein said ultraviolet lamp is placed approximately into a center of said spiral shape formed by said tube.

12. A method for making ice with treated water, comprising the steps of:

providing an incoming stream of water to an ice-making machine having a water inlet for receiving an incoming stream of water, a supply of recirculating water, a reservoir for containing said supply, a pump for pumping water from the reservoir a transport conduit for transporting pumped water from the reservoir to an evaporator plate, the evaporator plate receives water from the transport conduit and over which at least one of said incoming stream and said recirculating supply of water can flow to form ice, water flowing from the evaporator plate is received in the reservoir for recirculation;

exposing at least one of the incoming stream of water and the recirculating supply to a disinfectant treatment means being disposed in operational relationship to the transport conduit between the pump and the evaporator plate so that all water passing through the conduit is treated just prior to at least one of the stream and the supply flowing over said evaporator plate; and chilling and freezing a portion of at least one of said incoming stream and said recirculating supply to make a supply of ice on said evaporator plate.

13. The method of claim 12 wherein said treatment means comprises at least one ultraviolet disinfection device.

14. The method of claim 13 wherein said at least one ultraviolet disinfection device comprises:

at least one ultraviolet lamp; and transport means for transporting at least one of said incoming stream and said recirculating supply past said ultraviolet lamp.

15. The method of claim 14 wherein said transport means comprises at least one tube.

16. The method of claim 15 wherein said at least one tube includes a first tube which carries a first stream of water, and a second tube which carries a second stream of water past said at least one ultraviolet lamp.

17. The method of claim 15 wherein said at least one tube is comprised of material that is transparent to ultraviolet radiation.

18. The method of claim 17 wherein said at least one tube is wound into an approximately spiral shape.

19. The method of claim 18 wherein said ultraviolet lamp is placed approximately into a center of said spiral shape formed by said tube.

20. The method of claim 12 wherein said treatment means comprises at least one disinfection device including an ozone generator disposed for introducing ozone into the water for ozone treatment of the water.

21. The method of claim 12 wherein said treatment means comprises at least one filtration device.

22. The method of claim 21 wherein said at least one filtration device incorporating anti-bacterial materials selected from the group consisting of hollow fibers, membrane material, halogenated resin, silver-carbon, copper and zinc.

23. An ice-making machine comprising:

a water inlet for receiving an incoming stream of water;

a supply of recirculating water;

a reservoir for containing the supply;

a pump for pumping the supply from the reservoir;

a transport conduit for transporting water pumped from the reservoir;

an evaporator plate in fluid communication with the transport conduit, which receives water from the transport conduit and over which at least one of said incoming stream and said recirculating supply can flow to form ice;

said reservoir disposed relative to said evaporator plate to receive water flowing from said evaporator plate for recirculation; and means for treating at least one of the incoming stream and the recirculating supply in the transport conduit, said means for treating having disinfectant properties and being disposed in operational relationship to the transport conduit between the pump and the evaporator plate so that all water passing through the conduit is treated just prior to at least one of the stream and the supply flowing over said evaporator plate.

24. The ice-making machine of claim 23 wherein said treatment means comprises at least one ultraviolet disinfection device.

25. The ice-making machine of claim 24 wherein said ultraviolet disinfection device comprises:

at least one ultraviolet lamp; and transport means for transporting at least one of said incoming stream and said recirculating supply past said ultraviolet lamp, wherein said transport means comprises at least one tube comprised of material that is transparent to ultraviolet radiation and which is wound into a spiral shape.

26. The ice-making machine of claim 25 wherein said at least one tube includes a first tube which carries a first stream of water, and a second tube which carries a second stream of water, past said at least one ultraviolet lamp.

27. The ice-making machine of claim 25 wherein said ultraviolet lamp is placed into the center of said spiral shape formed by said at least one tube.

28. The ice-making machine of claim 23 wherein said treatment means comprises at least one filtration device.

29. The ice-making machine of claim 28 wherein said at least one filtration device incorporates anti-bacterial materials selected from the group consisting of hollow fibers, membrane material, halogenated resin, silver-carbon, copper and zinc.

* * * * *